United States Patent [19]
Bennett et al.
[11] 3,976,759
[45] Aug. 24, 1976

[54] PROCESS FOR REMOVAL OF FLUORIDE COMPOUNDS FROM SPENT ALKYLATION CATALYST

[75] Inventors: Richard H. Bennett; James W. Brockington; Lloyd E. Line, Jr., all of Richmond, Va.

[73] Assignee: Texaco Inc., New York, N.Y.

[22] Filed: Dec. 30, 1974

[21] Appl. No.: 537,505

[52] U.S. Cl. ................................ 423/484; 423/342; 423/467; 423/531; 252/413
[51] Int. Cl.² ...................... C01B 7/22; C01B 33/08
[58] Field of Search ........... 423/484, 483, 531, 342, 423/467

[56] References Cited

UNITED STATES PATENTS

| | | | |
|---|---|---|---|
| 1,960,347 | 5/1934 | Osswald et al. | 423/484 |
| 2,507,605 | 5/1950 | Lopker | 423/483 |
| 2,526,776 | 10/1950 | Smith et al. | 423/483 |
| 3,199,952 | 8/1965 | Zanon et al. | 423/483 |
| 3,677,701 | 7/1972 | Hollingsworth et al. | 423/483 X |

*Primary Examiner*—Edward Stern
*Attorney, Agent, or Firm*—T. H. Whaley; C. G. Ries; Douglas H. May, Jr.

[57] ABSTRACT

A process for removal of fluoride compounds from spent alkylation catalyst containing fluorosulfonic acid and sulfuric acid wherein hydrogen fluoride and fluorosulfonic acid, in the presence of water, are removed by vacuum distillation following which the remaining sulfuric acid rich fraction of the spent catalyst is reacted with a silica containing material to convert most of the remaining residual hydrogen fluoride to silicon fluoride which is volatilized from the mixture to thereby provide a sulfuric acid effluent free of substantial amounts of fluoride compounds. The hydrogen fluoride recovered is reacted with sulfur trioxide to form fresh fluorosulfonic acid which is combined with sulfuric acid to provide fresh alkylation catalyst.

13 Claims, 1 Drawing Figure

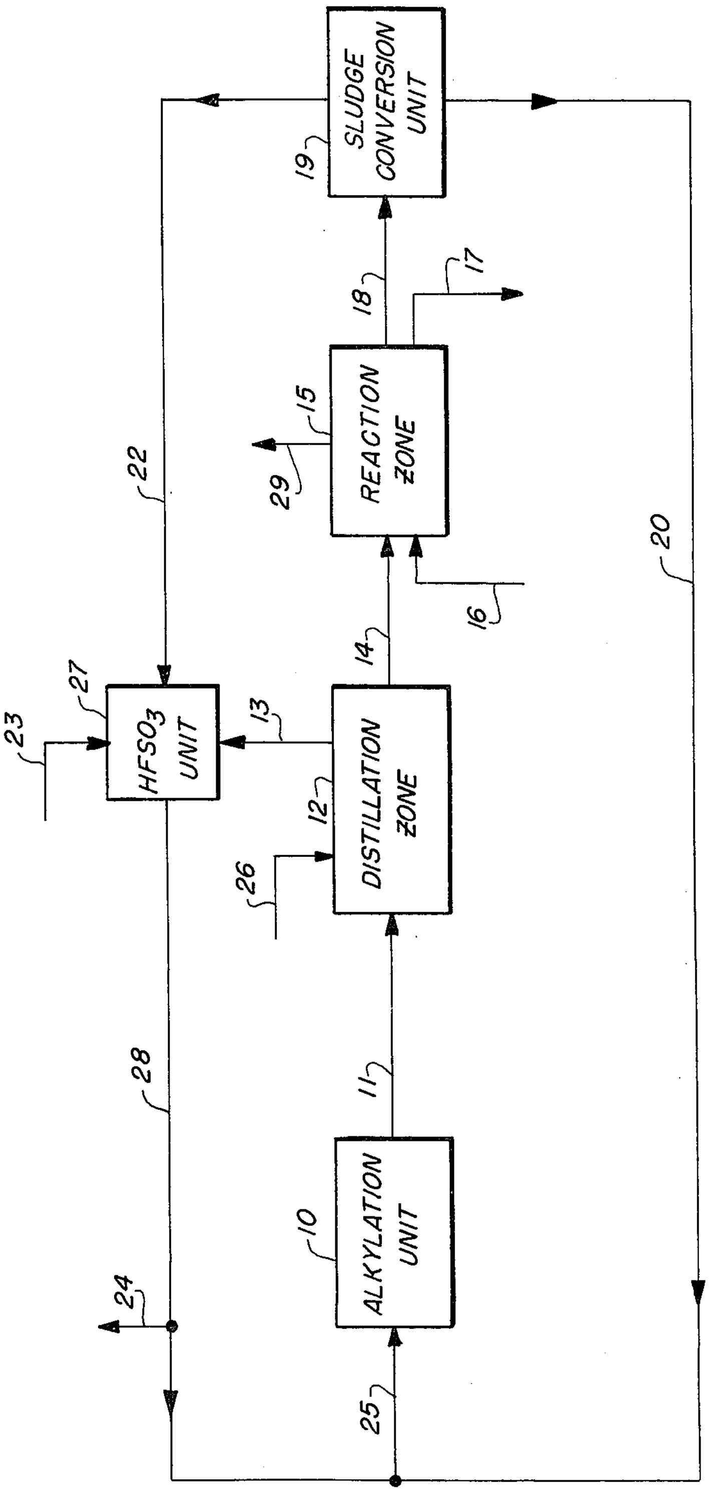
SLUDGE CONVERSION UNIT
REACTION ZONE
DISTILLATION ZONE
$HFSO_3$ UNIT
ALKYLATION UNIT
10
11
12
13
14
15
16
17
18
19
20
22
23
24
25
26
27
28
29

PROCESS FOR REMOVAL OF FLUORIDE COMPOUNDS FROM SPENT ALKYLATION CATALYST

BACKGROUND OF THE INVENTION

The present invention relates to a catalyst recovery process. More particularly, the present invention relates to a process for the removal of fluoride compounds from spent alkylation catalysts comprised of fluorosulfonic acid and sulfuric acid, and to the regeneration of fresh alkylation catalyst.

Liquid phase alkylation processes wherein an isoparaffin hydrocarbon, such as isobutane, isopentane, etc. are alkylated with olefin hydrocarbons such as propylene, butylenes, etc. for the production of alkylate products comprising highly branched $C_7 - C_8$ range paraffin hydrocarbons having high octane value, are well known and widely practiced. In such processes, the reactant hydrocarbons are usually contacted in the liquid phase, at elevated temperatures in the presence of acid alkylation catalysts and under conditions of good mixing, reaction pressures usually being only sufficient to maintain the reactants in the liquid phase.

Although numerous acid catalysts may be employed in such alkylation processes, an effective catalyst comprises a mixture of sulfuric acid and fluorosulfonic acid. One such catalyst, particularly effective in the alkylation processes under consideration is disclosed in copending United States Patent Application Ser. No. 520,595, filed Nov. 4, 1974. The novel alkylation catalyst disclosed in the aforementioned application comprises fluorosulfonic acid and sulfuric acid in a weight ratio of from about 0.11/1 to about 0.32/1, respectively, the catalyst having a titratable acidity in the range of 16.6 to 21 milli-equivalents per gram (meq/gm) and which may contain up to 3% by weight water and up to 10% by weight acid oils, the acid oils comprising relatively high molecular weight reaction products of sulfuric acid and hydrocarbons present in the process. In the process described in the aforementioned patent application, a $C_4 - C_6$ isoparaffin hydrocarbon such as isobutane is contacted with a $C_3 - C_5$ olefin hydrocarbon such as propylene, a butylene, or mixtures thereof, in a molar ratio of isoparaffin to olefin of from about 2/1 to 20/1, in the liquid phase, in the presence of the alkylation catalyst at a temperature in the range of from about 0°F. to about 100°F. Reaction pressures employed may range from ambient to superatmospheric, the pressure employed generally being sufficient to maintain the hydrocarbon reactants in the liquid phase. Since the reactants may be normally gaseous at alkylation reaction temperatures, reaction pressures generally range from about 10 to about 150 psig. Preferably, the alkylation reaction mixture is subjected to good mixing to form a hydrocarbon in continuous acid phase emulsion which comprises from about 40 to about 70 volume % acid phase and from about 60 to about 30 volume % hydrocarbon phase. Liquid volume ratios of isoparaffin hydrocarbons to olefin hydrocarbons of from about 2/1 to about 20/1 are generally employed in the process. Contact times for hydrocarbon reactants in the alkylation zone, in the presence of the alkylation catalyst, may range from about 0.5 to about 60 minutes. Preferably, the contact time is sufficient to ensure essentially complete conversion of olefin reactant in the alkylation zone. Such contact times are sufficient for providing an olefin space velocity in the range of about 0.1 to about 1.0 volumes olefin/-hour/volume of catalyst. The process may be conducted batchwise or continuously. It has been found that use of the catalyst described in the aforementioned patent application, in alkylating $C_4 - C_6$ isoparaffin with a $C_3 - C_5$ monoolefin, produces an alkylate of increased octane value over that obtained by prior art catalysts.

When using the above-described fluorosulfonicsulfuric acid alkylation catalyst, or for that matter, any sulfuric acid alkylation catalyst containing a similar fluoro acid, it is common practice to process the spent catalyst in such a fashion so as to regenerate fresh sulfuric acid, the major component of the catalyst. However, even though the fluorosulfonic acid is present as a minor component in the alkylation catalyst, because of its expense relative to that of sulfuric acid, it is desirable to recover, as well, the fluorosulfonic acid or any fluoro compounds which can be easily converted to the fluorosulfonic acid.

One method for recovering the sulfuric acid from the spent alkylation catalyst is to treat the spent catalyst in what is known as a sludge conversion unit. In such a unit the spent catalyst containing water and organic materials is charged to a furnace for oxidative conversion of all the sulfur species present to sulfur dioxide. The sulfur dioxide, in admixture with air, is then passed over a catalyst, e.g. $V_2O_5$ or some other such suitable oxidation catalyst, in a converter section of the unit to form $SO_3$. The $SO_3$ is then absorbed in a sulfuric acid solution to produce oleum which is then diluted with water to produce sulfuric acid of the desired concentration, i.e. 97 – 99 weight %, for the alkylation catalyst. The furnaces used in such sludge conversion units employ refractories which are readily attacked by HF or HF precursors such as fluorosulfonic acid. For example, to prevent damage to refractory furnace linings, fluoride concentrations (calculated as HF) of about 10 ppmw or less are particularly desirable. At levels above about 10 ppmw, fluoride attack upon refractory lining is accelerated, thus shortening the operating lifetime of such materials in the sludge conversion unit. Over and above the potential damage to the refractories in the furnace, any HF in the converter section would volatilize the vanadium from the $V_2O_5$ oxidation catalyst. Accordingly, a process which effectively recovers the fluorosulfonic acid or precursors thereof from the spent catalyst and also provides a feed to the sludge conversion unit substantially free of damaging fluoro compounds is highly desirable.

SUMMARY OF THE INVENTION

According to one embodiment of the present invention, the spent alkylation catalyst, comprised of fluorosulfonic acid and sulfuric acid, is subjected to a two-stage process to effect removal of most of the fluoride compounds from the spent catalyst so as to provide an acid effluent free of substantial amounts of fluoride compounds and suitable as a feed to a sludge conversion unit. In the first stage of the dual stage process, the spent catalyst is subjected to separation in a distillation zone. The distillation is conducted at atmospheric pressure or below in a temperature range of from about 50° to about 120°C. and in admixture with at least the stoichometric amount of water necessary to hydrolyze the fluorosulfonic acid in the spent catalyst to hydrogen fluoride. A vapor or first fraction comprising primarily hydrogen fluoride mixed with some fluorosulfonic acid and $SO_2$ is recovered from the distillation zone for further processing. In the second stage of the process, a second fraction recovered from the distillation zone and comprising the fraction of the spent catalyst remaining after removal of the first fraction is contacted, in a reaction zone, with a silica containing material such as sand, silica gel, etc., in an amount and for a period of time sufficient to effect reaction of the bulk of the residual hydrogen fluoride with the silica to form more volatile silicon fluoride ($SiF_4$) which is volatilized from the reaction zone. An acid effluent, free of substantial amounts of fluoro compounds, containing substantially all of the sulfuric acid present in the spent acid, and suitable for charging to a sludge conversion unit is then recovered from the reaction zone.

In another embodiment of the present invention, the above-described fluoro compound removal process is employed as part of an alkylation catalyst regeneration process. The hydrogen fluoride removed in the first stage is reacted with $SO_3$ to form fluorosulfonic acid. Additionally, the acid effluent from the second stage is treated in the sludge conversion unit to ultimately produce fresh sulfuric acid which is then combined with the fluorosulfonic acid obtained from the first stage of the process to produce fresh alkylation catalyst.

BRIEF DESCRIPTION OF THE DRAWINGS

The single FIGURE is a schematic flow diagram of the process of the present invention.

DESCRIPTION OF THE PREFERRED EMBODIMENT

Reference is now made to the accompanying drawing for a more detailed description of the process of the present invention.

Spent catalyst from alkylation unit 10 passes via line 11 into distillation zone 12, the primary treatment stage of the process. The spent catalyst from alkylation unit 10 comprises primarily sulfuric acid (about 88 – 90% by weight) and contains in addition, fluorosulfonic acid, (~15% by volume) water (3 – 4% by weight), acid oils, sulfonated and fluorinated organic materials and other side reaction products formed in the alkylation reaction. Generally, the total fluoride content, measured as HF, is in the range of 15,000 to 30,000 ppmw (parts per million weight). Distillation zone 12 is preferably operated at atmospheric pressure or below and elevated temperatures of from about 50° to about 120°C. It is desirable that the distillation apparatus be of a type which can generate a large surface area of spent catalyst, one such type of preferred apparatus being a multi-stage agitated vacuum digester.

As noted above, the distillation is conducted in the presence of at least the stoichiometric amount of water needed to hydrolyze the fluorosulfonic acid to hydrogen fluoride. Generally speaking, in spent alkylation catalyst the water content is from 3 to 4% by weight. Thus, in a typical spent alkylation catalyst, it is not necessary to add water to effect hydrolysis of all of the fluorosulfonic acid in the spent catalyst. As will be seen hereafter, however, conducting the distillation in the presence of a stoichiometric excess of water, e.g. up to 15% by weight of the spent catalyst, greatly enhances fluoride removal in the distillation zone. Accordingly, provision can be made for adding water to distillation zone 12 via line 26.

A light, substantially vapor fraction comprising primarily hydrogen fluoride, some fluorosulfonic acid and a small amount of $SO_2$ formed from oxidative side reactions flashes and is removed from distillation zone 12 via line 13. The hydrogen fluoride in the fraction removed via line 13 results not only from the hydrogen fluoride originally present in the spent catalyst and that formed by hydrolysis of the fluorosulfonic acid, but in addition, arises from decomposition of alkyl fluorosulfonates and other organofluoro compounds formed in the alkylation reaction.

A second, heavier fraction comprising the residual material from zone 12 and containing substantially all of the sulfuric acid present in the spent catalyst, plus residual hydrogen fluoride (preferably ≤ 100 ppmw HF), acid oils, water and other impurities is removed from distillation zone 12 via line 14 and transferred to reaction zone 15. Reaction zone 15 is the secondary treatment stage of the process and conveniently employs a vessel, preferably agitated, into which is introduced a particulate silica containing material via line 16. In reaction zone 15, which is preferably operated at elevated temperatures and sub-atmospheric pressure, the residual hydrogen fluoride present in the spent catalyst fraction removed from distillation zone 12, reacts with the silica to form silicon fluoride. Silicon, fluoride being more volatile than HF, is relatively easily separated from the mixture in zone 15. A substantially vapor fraction containing the silicon fluoride thus produced is removed via line 29 for disposal. Any nonreactive solids introduced with the silica containing material are removed from the reaction zone 15 via line 17 and sent to waste.

An acid effluent stream containing substantially all of the sulfuric acid present in the spent catalyst and preferably having a fluoride content, as HF, of ≤ 10 ppmw is removed from reaction zone 15 via line 18 and fed to sludge conversion unit 19. In sludge conversion unit 19, the spent catalyst, having a greatly reduced fluoride content, is combusted in a suitable furnace under conditions such that all the sulfur species present in the catalyst are converted to sulfur dioxide. The sludge conversion unit further contains a converter section employing an oxidation catalyst such as $V_2O_5$ which, in the presence of air, converts the $SO_2$ into $SO_3$. Part of the $SO_3$ thus produced is absorbed in a fresh sulfuric acid solution to form oleum which is then diluted with water to form 97 – 99 weight % sulfuric acid. The sulfuric acid thus produced is removed via line 20 for recycle to alkylation unit 10.

The light fraction removed from zone 12 via line 13 and comprising hydrogen fluoride, fluorosulfonic acid and $SO_2$, is introduced into fluorosulfonic acid regeneration unit 27 and combined with $SO_3$ to convert the HF to additional fluorosulfonic acid. A portion of the $SO_3$ in unit 27 may be obtained from unit 29 via line 22. Any additional $SO_3$ needed to convert the hydrogen fluoride to fluorosulfonic acid can be obtained from $SO_3$ make-up stream 23. The regenerated fluorosulfonic acid stream exits unit 27 via line 28. The $SO_2$ present in the fluorosulfonic acid stream is removed from line 28 via line 24 to provide a stream comprising substantially fluorosulfonic acid. The fluorosulfonic acid is then combined with the sulfuric acid from line 20 in the proper proportions to form fresh alkylation catalyst which is fed to alkylation unit 10 via line 25.

While reference has been made to the use of a multistage stirred vacuum digester in distillation zone 12, it is to be understood that other types of equipment can be employed. The purpose of the primary treatment stage or distillation zone is to remove the relatively volatile hydrogen fluoride from the spent catalyst. Thus, any means which will provide a large surface area of spent catalyst to allow efficient flashing of the hydrogen fluoride can be used. For example, rotary film evaporators, packed trickle towers, spray towers, baffle towers, rotary disc contactors, etc. can be employed.

Preferably, the distillation zone, i.e., the primary treatment stage, comprises distillation at atmospheric pressure or below and at elevated temperatures. Pressures in the distillation zone should be as low as economically practical and preferably below about 1 psia. Temperatures will, of course, depend on the pressures, but generally will range from about 50° to about 120°C., and preferably from about 80°, for example, 90, to 110°C. It has been found that if the spent alkylation catalyst is subjected to temperatures of 125°C. or higher for extended periods of time, the catalyst tends to thicken to a semi-solid mass. Thus, the temperatures should be kept below about 125°C. For a typical spent alkylation catalyst containing 20,000 to 30,000 ppmw fluoride as HF, it has been found that if the distillation zone is maintained at a temperature of around 100°C. and a pressure of about or below 1 psia, and under conditions affording increased surface area of the spent catalyst, 90% recovery, by weight, of the fluoride (calculated as HF) can be achieved without adverse degradation side reactions which occur at higher temperatures.

The residence time in the distillation zone will vary depending on pressure, temperature, fluoride content of the spent acid, water content, etc. Generally speaking, the residence time of the spent catalyst in the distillation zone should be sufficient to permit maximum hydrolysis of the fluorosulfonic acid to hydrogen fluoride and subsequent flashing of the hydrogen fluoride and/or remaining fluorosulfonic acid from the distillation zone. Additionally, relatively long residence times in the distillation zone promote the decomposition of organofluoro compounds in the spent catalyst into hydrogen fluoride and/or fluorosulfonic acid thereby maximizing the recovery of the fluorosulfonic acid for recycle to the alkylation unit and minimizing the fluoride removal needed in the second stage of the process.

However, while long residence times increase the fluoride recovery from the spent catalyst in the distillation zone, there is also a concomitant increase in the amount of $SO_2$ recovered in the vapor fraction with the hydrogen fluoride. Since $SO_2$ losses represent loss of sulfur for regeneration into fresh sulfuric acid, minimum digestion or residence time in the distillation zone consistent with adequate fluoride removal should be used so as to minimize such losses. In general, it has been found that at a temperature of about 100°C. and a pressure of about 1 psia or lower, a residence time of 4 hours or greater will effect removal of 90% by weight of the total fluoride, calculated as HF, from a typical spent catalyst, i.e. containing 20,000 – 30,000 ppmw fluoride. In such a typical spent catalyst, if the digestion time is increased to 6 hours or greater, as for example, from about 6 to about 8 hours, greater fluoride removal (about 97% by weight) can be obtained, e.g. from about 23,000 ppmw to about 700 – 800 ppmw. It has also been found that if the spent catalyst has a relatively low initial fluoride concentration, e.g. about 1000 – 1500 ppmw, calculated as HF, the fluoride level can be reduced to 74 ppmw after 2 hours and 33 ppmw after 8 hours. With ample residence time and at a temperature of around 100°C. and a pressure of 5 – 15 mm. Hg, the fluoride content (as HF) of a typical spent acid catalyst can be reduced to 100 ppmw or less.

While the distillation step of the process of the present invention can be conducted in the presence of the amount of water needed to stoichometrically react with the fluorosulfonic acid to form hydrogen fluoride, it has been found that higher water content in the spent catalyst greatly improves fluoride recovery in the distillation zone. As noted, typical spent catalyst contains 3 – 4% by weight water which is sufficient, as noted above, to effect good recovery of fluoride from spent catalyst in the distillation zone. However, when the water content of the spent catalyst contains up to 8% by weight water, and more preferably from about 8 to about 15% by weight water, the volatility of the fluorides in the spent acid is greatly increased. Apparently, the excess water is needed to (1) force the hydrolysis of the fluorosulfonic acid to HF which is more volatile, and/or (2) reduce the solubility of the HF in the spent acid catalyst. Indeed, the presence of approximately 15 weight % water in the spent catalyst will permit reduction of the fluoride content (calculated as HF) from around 24,000 ppmw, to about 50 ppmw after only 8 hours residence time in the distillation zone.

It is also possible to employ inert gas purging or stripping of the spent acid catalyst in the distillation zone. Thus, purge gases such as $N_2$, argon, helium, etc. could be used. Moreover, steam stripping could be employed, the steam serving the added purpose of supplying water to the system.

In the secondary treatment stage of the process of the present invention, the residual hydrogen fluoride in the spent catalyst is contacted with a silica containing material in an amount and for a period of time sufficient to convert at least a portion of the hydrogen fluoride to silicon fluoride which being more volatile than HF, is more easily separated from the spent catalyst. Virtually any material containing silica can be used. The term silica, as used herein, refers to the compound $SiO_2$ in anhydrous or hydrated form. The silica containing material can be either substantially pure silica, e.g. pure $SiO_2$, or any one of numerous naturally occurring substances such as glass, quartz, sand, flint, diatomite, various silicates, etc. Materials such as silica gel and fumed silica which have high surface area are quite desirable.

The amount of silica as $SiO_2$ which must be used in the reaction zone to effect removal of the residual HF can vary substantially, but preferably will be present in at least an amount, by weight, to stoichometrically react with the residual HF. Amounts larger than the stoichometrically needed amount are especially desirable since shorter residence times in the reaction zone can be used.

The total amount of silica containing material used in the reaction zone will vary depending upon the fluoride content of the spent acid catalyst, the silica content of the material, temperature conditions, contact times, surface area of the silica containing material, etc. However, in general, the amount, by weight, of silica containing material used will be such as to provide an amount of silica to stoichometrically react with the residual HF. Larger amounts of silica containing material containing the stoichometric amount of silica, reduce the time in the reaction zone and therefore, are especially desirable. It should be observed that the silica containing material charged to the reaction zone can be used until it completely reacts with the HF to form silicon fluoride. The silicon fluoride being volatile is easily removed, leaving no reaction products deposited on the remaining silica to impede further reaction. It will be apparent that to effect efficient removal of the residual hydrogen fluoride in the spent catalyst fraction in the reaction zone, there must be sufficient contact time between the spent catalyst and the silica. The actual contact or residence time required will depend upon several variables, such as for example, particle size of the silica containing material, the silica content of the material, surface area of the material, the fluoride content of the catalyst, the temperature, etc. Accordingly, no specific residence time can be stated. However, it has generally been found that when the contacting is carried out at an elevated temperature as, for example, approximately 100°C., a residence time of about 4 hours or greater, is required to obtain maximum reduction in the fluoride level.

While the particle size of the silica containing material is not critical, because of increased surface area, materials of relatively fine particle size, e.g. < 100 microns, are generally preferred. Silica containing materials of such a particle size have surface areas of 100 $m^2/g$ and greater, thus providing much greater contact area for reaction of the hydrogen fluoride with the silica. However, while a silica containing material of relatively large particle size, e.g. > 100 microns may require a longer residence time to effect the desired reduction in the fluoride content, such material will work satisfactorily. Since large surface areas of the silica containing material enhance the fluoride removal, materials such as silica gel and fumed silica which generally have extremely high surface areas make desirable materials for use in the reaction zone.

Preferably the reaction zone is operated at elevated temperatures, the rate of reaction of the hydrogen fluoride with the silica being enhanced at elevated temperatures. Generally speaking, a temperature in the range of from about 50° to about 120°C. promotes efficient reaction between the hydrogen fluoride and the silica, a temperature in the range of from about 90° to about 110°C. being particularly desirable.

Pressures in the reaction zone should be low enough to permit good volatilization or distillation of the silicon fluoride. Generally, then, the pressures in the reaction zone will be below atmospheric, and preferably about 1 psia or lower.

To aid in flashing the silicon fluoride from the reaction zone, inert sweep or purge gas streams can be used. Typical gases include $N_2$, helium, argon, etc.

As described above, the process of the present invention also provides a method for regeneration of fresh alkylation catalysts. The hydrogen fluoride which is removed in the primary treatment stage can be reacted with sulfur trioxide to form fluorosulfonic acid which together with the fluorosulfonic acid removed in the distillation zone can be employed as one of the components of fresh alkylation catalyst. Likewise, the substantially fluoride free spent acid fed to the sludge conversion unit is ultimately used to generate fresh sulfuric acid, thus providing the other component of the alkylation catalyst. The sludge conversion unit can also provide at least a portion of the sulfur trioxide used to react with the hydrogen fluoride recovered from the primary treatment stage to form the fluorosulfonic acid. In forming the fresh alkylation catalyst, the fluorosulfonic and sulfuric acids are combined in a weight ratio of from about 0.11/1 to about 0.32/1, respectively, to form an acid catalyst. The fresh catalyst may, in addition, contain up to 3% by weight water.

The process of the present invention not only provides an efficient method for the recovery of the fluorosulfonic acid from the spent alkylation catalyst, but in addition, provides a feed for the sludge conversion unit which is substantially free of deleterious amounts of fluoride. As previously noted, the sludge conversion unit employs a refractory lined furnace which is readily attacked by hydrogen fluoride. Accordingly, to avoid damage to the refractory, it is necessary that the hydrogen fluoride content of the feed be reduced as much as possible, if not eliminated. Additionally, removal of the fluoride from the spent acid ensures that the sulfur dioxide produced in the sludge conversion unit will be substantially free of fluoride compounds which could volatilize the vanadium in the $V_2O_5$ oxidation catalyst used to convert the $SO_2$ to $SO_3$.

To further illustrate the advantages of the present invention, the following non-limiting examples are presented. All fluoride contents are by weight and calculated as HF unless otherwise indicated.

EXAMPLE I

A 200 ml. sample of spent alkylation acid catalyst containing 23,600 ppm fluoride was placed in a one-liter stirred reactor maintained at 100°C. and 5 – 15 mm. Hg absolute pressure for 8.5 hours, the evolving HF and $HFSO_3$ being collected. Periodic analysis of the spen acid catalyst showed 40% of the fluoride has been removed after 4 hours, a fluoride content residual of 1530 ppm after 6.5 hours, and 780 ppm after 8.5 hours.

EXAMPLE II

The procedure of Example I was followed except the spent alkylation catalyst was admixed with an amount of water equal to 5% by weight of the spent acid catalyst in the reactor which brought the total water content of the spent acid catalyst to about 8 – 9% by weight. It was found that after 8 hours of digestion (distillation), the spent acid catalyst had a residual fluoride content of 450 ppm.

EXAMPLE III

The procedure of Example II was followed with the exception that an amount of water equal to 10 weight % of the spent acid catalyst was added bringing the total water content of the spent catalyst in the reactor to about 13 – 14%. It was found that after 8 hours of digestion, the spent acid catalyst had a residual fluoride content of 50 ppm.

EXAMPLE IV

A 14 g. sample of residual spent acid obtained as per the general procedure of Example I and containing 17,800 ppm fluoride was stirred with a 28.2g charge of ⅛ inch diameter glass beads at 150°C. for 22 hours and 25 mm. Hg absolute pressure. The evolving silicon fluoride was discarded. Analyses of the effluent acid showed a fluoride concentration of 47 ppm.

EXAMPLE V

A 29.2 g. sample of residual spent acid obtained as per the general procedure of Example I and containing 363 ppm fluoride was heated in the presence of 2.3 g. of glass wool for 4 hours at 100°C. and 30 mm. Hg absolute pressure, the evolving silicon fluoride being discarded. The fluoride level of the sample was reduced to 77 ppm.

EXAMPLE VI

A 30.6 g. sample of residual spent acid obtained as per the general procedure of Example I and containing 768 ppm fluoride was heated in the presence of 12.4 g of 10 – 30 mesh sand for 5 hours at 105° – 110°C. and 70 mm. Hg absolute pressure. A slow $N_2$ purge was used during the reaction to sweep the silicon fluoride from the reaction mixture. Analysis of the residual acid showed a fluoride content of 26 ppm.

EXAMPLE VII

Approximately 200 ml. of spent alkylation catalyst which had been subjected to the primary distillation step and containing 21 ppm fluoride was mixed with 10 ml. of 80 – 120 mesh sand and heated for 6 hours at 100°C. and 10 mm. Hg absolute pressure. The residual fluoride content of the treated spent catalyst was found to be 17 ppm.

EXAMPLE VIII

Distillates obtained following the generally procedure of Example I from two samples of spent acid were collected in a liquid $N_2$ cooled trap, warmed to 0°C., and mixed with liquid $SO_3$. The resulting solutions were distilled at reduced pressure to purify the fluorosulfonic acid. The data for regeneration of the fluorosulfonic acid is given in Table I below.

TABLE I

| Run No. | 1 | 2 |
|---|---|---|
| Spent Acid Charged, gms. | 340 | 324 |
| Initial F Conc., ppm | 25,600 | 25,600 |
| Initial $H_2O$ Conc., wt. % | 2.4 | 2.4 |
| Organics, wt. % $CH_2$ | 5.13 | 5.13 |
| $H_2O$ Added During Digestion, wt. % | 10.0 | 5.0 |
| Final $H_2O$ Conc., wt. % | 13.0 | 10.7 |
| Final F Conc. (after seven hours digestion), ppm | 25 | 594 |
| Distilled $HFSO_3$, gms. | 31.8 | 30.3 |
| Boiling Pt.,[a] °C. | 70–73 at 2.9 kPa (22 mm. Hg) | 75 at 3.3 kPa (25 mm. Hg) |
| F, wt. % | 20.0 | 23.6 |
| Purity Basis Titratable Acidity (after hydrolysis to HF + $H_2SO_4$), wt. % $HFSO_3$ | | 98.0 |
| Recovery as $HFSO_3$, wt. % (basis F content of spent acid) | 69 | 69 |
| Overall F Balance, wt. % | 85 | 75 |
| $HFSO_3$/($HFSO_3$ + Heavy Ends) | 0.85 | 0.85 |

[a]Lit. B. P. Data 77°C. at 2.5 kPa (19 mm. Hg) — Kirk-Othmer Encyclopedia of Chem. Tech., 2nd Ed., Vol. 9, p. 676 (1966).

As can be seen from the data above, the process of the present invention provides an efficient method for the removal of fluoro compounds from spent alkylation catalyst. With reference to Examples I – III, it can be seen that the distillation step effects substantial removal of the fluoro compounds from the spent catalyst. As can be seen from Examples IV – VII, the secondary treatment stage provides a spent acid catalyst free from substantial amounts of fluoro compounds.

With reference to Example VIII, it is to be observed that the process herein provides an efficient method of regenerating fluorosulfonic acid from the spent catalyst. Note that overall fluoride balances of 75 and 85% were observed for the two runs.

It can be seen that by employing the process of the present invention, potential damage to the refractory lining in the furnace of the sludge conversion unit, and any loss of the $V_2O_5$ oxidation catalyst by fluoride vaporization of the vanadium can be virtually eliminated.

The present invention has been described with reference to several specific embodiments thereof, and accordingly, it will be apparent that many modifications, substitutions, and omissions will be readily suggested to a person of ordinary skill in the art without departing from the spirit of the present invention. Therefore, it is to be understood that the scope of the invention is to be determined solely by the claims appended hereto.

I claim:

1. A process for removal of fluoride compounds from spent alkylation catalyst containing fluorosulfonic acid, organofluoro compounds, and sulfuric acid comprising:

a. subjecting said spent catalyst to distillation, at atmospheric pressure or below, at a temperature in the range of from about 50° to about 120°C. and in admixture with at least the stoichiometric amount of water necessary to hydrolyze said fluorosulfonic acid to hydrogen fluoride and for a period of time sufficient to effect at least partial decomposition of at least some organofluoro compounds in said spent catalyst into hydrogen fluoride and/or fluorosulfonic acid;

b. recovering a first fraction from said distillation, said first fraction comprising primarily hydrogen fluoride;

c. recovering a second fraction from said distillation, said second fraction comprising residual hydrogen fluoride and the greater part of said sulfuric acid present in said spent catalyst;

d. contacting, in a reaction zone, said second fraction with a silica containing material in an amount and for a period of time sufficient to react at least a portion of said residual hydrogen fluoride with said silica to form silicon fluoride;

e. volatilizing said silicon fluoride from said reaction zone; and f. recovering from said reaction zone an effluent acid fraction containing the greater part of said sulfuric acid present in said spent catalyst and being free of substantial amounts of fluoride compounds.

2. The process of claim 1 wherein said distillation is conducted under conditions affording increased surface area of said spent catalyst.

3. The process of claim 1 wherein said distillation is conducted at a pressure of about 1 psia or lower and a temperature in the range of from about 80° to about 110°C.

4. The process of claim 3 wherein said distillation is conducted in the presence of from about 3 to about 8% by weight water.

5. The process of claim 3 wherein said distillation is conducted in the presence of from about 8 to about 15% by weight water.

6. The process of claim 5 wherein said spent catalyst is subjected to said distillation at a temperature of about 100°C. and for a period of time such that said second fraction has a fluoride content of about 100 ppmw or less calculated as hydrogen fluoride.

7. The process of claim 3 wherein said spent catalyst is subjected to said distillation for a period of 4 hours or greater.

8. The process of claim 3 wherein said distillation of said spent catalyst is conducted at a temperature of about 100°C. in admixture with from about 8 to about 15% by weight water.

9. The process of claim 1 wherein said contacting in said reaction zone is conducted at a temperature in the range of from about 50° to about 120°C. and at subatmospheric pressure.

10. The process of claim 9 wherein said contacting is carried out for a period of about 4 hours or greater.

11. The process of claim 9 wherein said silica containing material has a silica content, by weight, of about at least the stoichometric amount necessary to convert said residual hydrogen fluoride to silicon fluoride.

12. The process of claim 11 wherein said contacting is conducted at a pressure of about 1 psia or lower.

13. The process of claim 8 wherein said contacting in said reaction zone is conducted at a temperature of about 90° to about 110°C., at a pressure of about 1 psia or lower, in the presence of a silica containing material having a silica content, by weight, of at least the stoichometric amount necessary to convert said residual hydrogen fluoride to silicon fluoride.

* * * * *